US008793379B2

(12) United States Patent
Upadhya

(10) Patent No.: US 8,793,379 B2
(45) Date of Patent: Jul. 29, 2014

(54) SYSTEM OR METHOD TO AUTOMATICALLY PROVISION A STORAGE VOLUME BY HAVING AN APP-AWARE BASED APPLIANCE IN A STORAGE CLOUD ENVIRONMENT

(75) Inventor: Pavan Belur Gopalakrishna Upadhya, Bangalore (IN)

(73) Assignee: LSI Corporation, San Jose, CA (US)

( * ) Notice: Subject to any disclaimer, the term of this patent is extended or adjusted under 35 U.S.C. 154(b) by 456 days.

(21) Appl. No.: 13/286,402

(22) Filed: Nov. 1, 2011

(65) Prior Publication Data
US 2013/0111034 A1 May 2, 2013

(51) Int. Cl.
*G06F 15/173* (2006.01)
(52) U.S. Cl.
USPC ............ 709/226; 717/174; 717/120; 718/104
(58) Field of Classification Search
None
See application file for complete search history.

(56) References Cited

U.S. PATENT DOCUMENTS

| | | | |
|---|---|---|---|
| 6,801,992 B2 | 10/2004 | Gajjar et al. | |
| 7,587,570 B2 | 9/2009 | Sarkar et al. | |
| 7,930,476 B1 * | 4/2011 | Castelli et al. | 711/114 |
| 8,261,295 B1 * | 9/2012 | Risbood et al. | 719/328 |
| 8,589,916 B2 * | 11/2013 | Gao et al. | 717/177 |
| 8,621,051 B2 * | 12/2013 | Agarwala et al. | 709/220 |
| 2010/0332629 A1 * | 12/2010 | Cotugno et al. | 709/221 |
| 2011/0107327 A1 * | 5/2011 | Barkie et al. | 717/176 |
| 2011/0161952 A1 * | 6/2011 | Poddar et al. | 717/173 |
| 2011/0231899 A1 * | 9/2011 | Pulier et al. | 726/1 |
| 2012/0084769 A1 * | 4/2012 | Adi et al. | 717/174 |
| 2013/0054426 A1 * | 2/2013 | Rowland et al. | 705/27.2 |
| 2013/0097610 A1 * | 4/2013 | Graham et al. | 718/104 |
| 2013/0290543 A1 * | 10/2013 | Lochhead et al. | 709/226 |

\* cited by examiner

*Primary Examiner* — Greg C Bengzon
(74) *Attorney, Agent, or Firm* — Christopher P. Whitham; Cochran Freund & Young LLC

(57) ABSTRACT

Disclosed is a method and system for automatic end-to-end storage provisioning by an application aware appliance of a software application served by a computing cloud based on a user request for a cloud served software application. Embodiments may automatically select and configure both the server computing resources and the storage volume/array to implement a cloud based software application. A user request may identify characteristics of requested server computing resources, but need only specify the desired software application, and the embodiments will automatically select/create a storage volume/array and copy the requested software application onto the selected/created storage volume/array. Embodiments may also automatically create a remote volume/array mirror to permit failover in case of a problem with the primary storage volume/array and/or intelligently choose the type of storage volume/array to match high speed data storage to high speed applications and lower speed data storage to less input/output intensive applications.

15 Claims, 5 Drawing Sheets

500 FLOW CHART OF OPERATION FOR AN EMBODIMENT WITH VARIOUS ADDITIONAL FEATURES

SYSTEM OR METHOD TO AUTOMATICALLY PROVISION A STORAGE VOLUME BY HAVING AN APP-AWARE BASED APPLIANCE IN A STORAGE CLOUD ENVIRONMENT

BACKGROUND OF THE INVENTION

Cloud computing is a name given to a relatively recent software application/service provider paradigm. Similar to traditional client/server computing, cloud computing provides software over a network to a remote user rather than as software installed directly on the computer/computing device local to the application/service user. For cloud computing, the network is typically an Internet type of large network (i.e., using Internet protocols), which is most likely the public Internet, but may be a proprietary implementation of a network similar in topology/implementation to the public Internet. Accordingly, unlike traditional client/server computing, the client typically does not know where the computing resources are for the server providing the software application/service. Further, a standard web browser may be used for many, but not all, software applications/services, which means that it may be unnecessary to load any client software on the local computer of the user as long as the local computer has a standard web browser available. For some particularly specialized applications, it may still be beneficial to provide a custom graphical user interface (i.e., a sort of customized web browser) on the local computing device in order to provide a better user experience than may be possible via a standard web browser. In cloud computing, high end server computing resources may be shared by several users and the server computing resources (including computation intensive processes) may be more optimally utilized than for the traditional method of installing most products in entirety on the local user computing device and depending on the computation power of the local computing device to perform all of the computing tasks of a particular software application. Further, with ever-expanding wireless access to the public Internet, cloud computing may also be used extensively on portable devices, which may also permit the portable devices to require significantly less computing power.

SUMMARY OF THE INVENTION

An embodiment of the present invention may comprise a method for automatic end-to-end storage provisioning by an application aware appliance of a software application served by a computing cloud based on a user request for a cloud served software application comprising: receiving, at the application aware appliance, the user request for the cloud served software application, the user request for the cloud served software application containing identifying information about the requested cloud served software application including at least a server computing resource identification information portion and a software identification information portion; selecting, by the application aware appliance, server computing resources for running the requested cloud served software application from a server computing cloud that is a subset of the computing cloud based on the server computing resource identification information portion of the user request for the cloud served software application; identifying, by the application aware appliance, Host Bus Adapter (HBA) data of the selected server computing resources; selecting, by the application aware appliance, a software application storage template from a plurality of software application storage templates based on the software identification information portion of the user request for the cloud served software application, each software application storage template of the plurality of software application storage templates being associated with a copyable installation of the requested cloud served software application associated with each software application storage template; selecting, by the application aware appliance, a storage volume from a plurality of available storage volumes that are part of a storage resource cloud that is a subset of the computing cloud that meets storage requirements of the selected software application storage template; copying, by the application aware appliance, the copyable installation of the requested cloud served software application associated with the selected software application storage template to the selected storage volume; identifying, by the application aware appliance, storage identification data of the selected storage volume; mapping the storage identification data of the selected storage volume to the Host Bus Adapter (HBA) data of the selected server computing resources; configuring, by the application aware appliance, the selected server computing resources to operate using the selected storage volume based on the storage identification data of the selected storage volume; and operating, by the computing cloud, the selected server computing resources and the selected storage volume together to serve the requested cloud served software application.

An embodiment of the present invention may further comprise a application aware appliance system for automatic end-to-end storage provisioning of a software application served by a computing cloud based on a user request for a cloud served software application comprising: an application/service request reception sub-system that receives the user request for the cloud served software application, the user request for the cloud served software application containing identifying information about the requested cloud served software application including at least a server computing resource identification information portion and a software identification information portion; a server computing resources selection sub-system that selects server computing resources for running the requested cloud served software application from a server computing cloud that is a subset of the computing cloud based on the server computing resource identification information portion of the user request for the cloud served software application; a HBA identification sub-system that identifies Host Bus Adapter (HBA) data of the selected server computing resources; a software application storage template selection sub-system that selects a software application storage template from a plurality of software application storage templates based on the software identification information portion of the user request for the cloud served software application, each software application storage template of the plurality of software application storage templates being associated with a copyable installation of the requested cloud served software application associated with each software application storage template; a storage volume selection sub-system that selects a storage volume from a plurality of available storage volumes that are part of a storage resource cloud that is a subset of the computing cloud that meets storage requirements of the selected software application storage template; a copy application software sub-system that copies the copyable installation of the requested cloud served software application associated with the selected software application storage template to the selected storage volume; a storage identification sub-system that identifies storage identification data of the selected storage volume; a storage mapping sub-system that maps the storage identification data of the selected storage volume to the Host Bus Adapter (HBA) data of the selected server computing resources; and a server computing resources configuration sub-system that configures the selected server computing resources to operate using the selected storage volume based on the storage identification data of the selected storage volume such that the computing cloud may operate the selected server computing resources and the selected storage volume together to serve the requested cloud served software application.

DETAILED DESCRIPTION OF THE EMBODIMENTS

Figure 1:
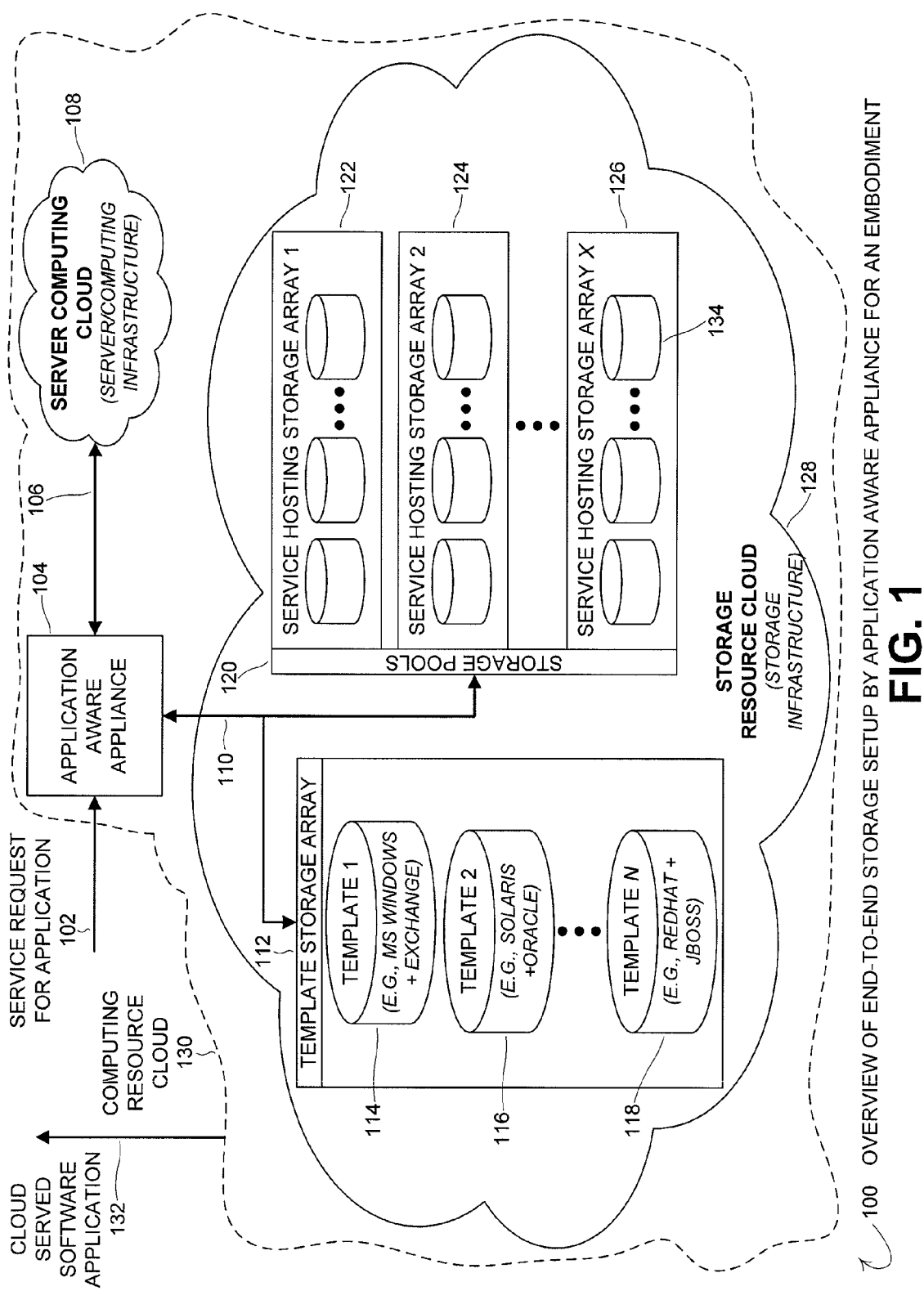
FIG. 1 is a schematic illustration of an overview of an end-to-end storage setup by an application aware appliance for an embodiment.

Many businesses are exploring and/or migrating to cloud computing infrastructures as the cost of owning and managing in-house data centers continues to increase as well as the cost to buy, maintain, and keep current a large number of individual personal computers also keeps increasing. Since maintaining a high-level of Information Technology (IT) expertise in-house is often difficult for businesses as well as being decidedly outside the general scope of typical business expertise needed for many non-technical businesses that still need computer access to remain competitive in the marketplace.

A company/business that specializes in providing cloud served software applications/services is often described as a "cloud service company." As businesses migrate to a cloud computing infrastructure, the businesses typically demand a high quality of service, meeting or exceeding the current in-house infrastructure the businesses are replacing. Thus, a cloud service company faces many challenges to successfully provide requested applications/services to demanding customers that already have existing expectations of product quality based on past experiences with in-house or otherwise locally provided applications/services. One of the primary areas of responsibility for a cloud service company is providing the necessary back end infrastructure for each cloud served application/service managed by the cloud service company. The back end infrastructure includes making the necessary computing server and computer readable storage media available as well as designating the server computing resources and the associated computer readable storage resources for each application/service including installing and configuring the application/service on the storage/computing resources so a user may be able to access the application/service over the designated Internet type network (typically the standard public Internet, but in some cases it may be a proprietary Internet type network). A cloud service company may use a manual approach to set up the back end infrastructure in order to ensure that the back end infrastructure is properly created and of the high quality.

For instance, one manual approach a cloud service company may take is each time a customer requests an application/service, an Information Technology (IT) Administrator for the cloud service company may manually create the back end infrastructure. The IT Administrator may manually create the back end infrastructure by creating/selecting the necessary storage volume/array for storing the software application/service, selecting the server computing resources to run the software application/service, installing the software for the requested application/service on the selected storage volume/array, and manually configuring the selected storage volume/array and computing resources to properly operate together to provide the requested application/service from the computing cloud. The manual approach, while having the flexibility of a human being to perform a wide variety tasks and quality assurance tests, may still suffer from long delay times until the IT Administrator is available plus the time it takes for the IT Administrator to manually perform the setup procedures. For a repetitive task, such as setting up the same software application/service for different clients, the manual approach may also be susceptible to human error in the setup and configuration process. Further, due to manpower and budget constraints and the fact that a person may take some time to perform the necessary tasks, even under the best circumstances, a manual implementation does not provide the immediate feedback and access that many users associate with Internet/electronic purchases.

FIG. 1 is a schematic illustration 100 of an overview of an end-to-end storage setup by an application aware appliance 104 for an embodiment. An embodiment may provide a method and/or system for automating the provisioning/implementation of a user service request 102 for a cloud served software application/service 132. Unlike a manual setup process, the automatic setup performed by an embodiment may permit complete end-to-end provisioning of a cloud served software application/service 132, including selecting and configuring both the server computing resources and the computer readable media storage resources. To automatically provision a requested 102 cloud served software application 132, an embodiment may employ an application aware appliance 104 that, from the perspective of a user, sits within the computing resource cloud 130. Also within the computing resource cloud 130 is a server computing cloud 108 and a storage resource cloud 128 that are both subsets of the larger, inclusive computing resource cloud 130. The server computing cloud 108 contains the server computing resources (e.g., server computers/electronic computing devices) that provide the computing power/resources to operate the requested 102 cloud server software application 132. The storage resource cloud 128 contains the computer readable storage resources that store the data and the computer instructions (i.e., software) associated with the requested 102 cloud served software application 132. Thus, to provide a properly functioning cloud served software application 132, the server computing resources from the server cloud 108 and the storage resources from the storage resource cloud 128 need to be selected and then configured to work with each other. Further, the selected storage resources from the storage resource cloud need to be provisioned (i.e., have installed) all of the software necessary to properly deliver the cloud served software application 132 to a user. A typical installation may include operating system software in addition to any specific software that implements the requested 102 cloud served software application 132. For instance, a complete installation may include a Microsoft Windows operating system plus Microsoft Exchange in order to provide a Microsoft Exchange service in response to a user request for the Microsoft Exchange Service. More complicated implementations may include multiple software packages on top of an operating system, such as a specialized software package that operates in combination with a general purpose database, in order to deliver the desired functions of a particular cloud served software application 132. Thus, an embodiment that provides automatic end-to-end storage provisioning will automatically select/create the necessary storage volume/array to hold the software application code and associated data, install the necessary software on the selected storage volume/array, select the necessary computing resources to run the software code stored on the selected storage/array, and configure the entire system to operate together including configuring the selected computing resources to boot from the operating system software installed on the selected storage volume/array.

An embodiment may perform the automatic end-to-end storage provisioning by including an application aware appliance 104 that will appear as part of the computing resource cloud 130 to a user. A user may then send a service request for an application 102 that will then automatically be provided to the user by an embodiment from the computing resource cloud 130. The application aware appliance 104 may effectively sit between the server computing cloud 108 and the storage resource cloud 128 such that the application aware appliance 104 may automatically act on both the storage resources 128 and the computing resources 108 to select, configure, and provision the storage 128 and computing 108 resources to operate together to provide the requested 102 cloud served software application from the computing resource cloud 130. Further, by sitting between the server computing cloud 108 and the storage resource cloud 128, the application aware appliance also permits the computing resources in the server computing cloud to be independent and unaware of the storage resource cloud/infrastructure 128 allowing for potentially more flexible and optimized utilization of both storage and server computing resources. The provisioning of the storage resources in the storage resource cloud 128 by the application aware appliance 104 may include installing software and configuring the storage resource to be ready to boot from the Storage Area Network (SAN) having the selected storage resource. The storage resource may then be bootable from computing resource in the server computing cloud 108 whether the selected computing resources are one or more physical servers and/or one or more virtual servers. The application aware appliance 104 is also aware of the actual application in the service request for an application 102 from the user and may intelligently act to properly select, configure and provision the storage and computing resources based on the requested application 102 and without the need to identify particular specifications of the storage resources. In other words, the application aware appliance 104 may perform the selection, configuration and provisioning (i.e., software installation) of the storage resources based simply on the request for a software application 102 and without a need for the user to include any particular technical storage requirements in the application/service request 102.

With the application aware appliance 102, an embodiment may permit the server computing resources in the server cloud 108 to effectively be unaware of the storage resources in the storage cloud 128 irrespective of the requirements both from a storage point of view, as well as from an application/service (that are requested 102) point of view. By using storage virtualization for required storage resource selection/creation and combining the storage virtualization selection/creation with software provisioning (software installation/copying), the process of implementing the application/service request 102 for an embodiment may be made transparent to an end user because the request 102 may be fulfilled automatically and quickly in response to the request 102 received from an user. Due to the automatic processes of the application aware appliance 104 handling the user request 102, the request 102 is fulfilled at the time the user sends the request 102 without any need to wait for an IT Administrator to schedule and actually manually implement the request 102.

Operation of an embodiment is typically started when the application aware appliance 104 receives a user service request for an application 102. The application aware appliance 104 may be any computing device or group of multiple devices operating together that are capable of receiving the user software application/service request 104 and acting based on the user request 104 to select/create the necessary storage/computing resources, configure the storage/computing resources to work together, and provision the storage resources with the necessary software to implement the requested 102 cloud served software application 132. In some embodiments the application aware appliance may be implemented via a single general or special purpose computer running software implementing the methodology of an embodiment. Other embodiments may split processes of an embodiment between a plurality of computing devices, each of which may be a general purpose computer or a special purpose computing platform. For instance, an embodiment similar to the embodiment disclosed below with respect to FIG. 2 may include a management station 234 and a Storage Virtualization Manager (SVM) 236 that together make up/perform the processes of the application aware appliance 104. As will be discussed in greater detail in the disclosure below with respect to FIG. 2, the management station 234 and SVM 236 may each be implemented as a general purpose computer running special purpose software to implement a desired subset of the processes of the application aware appliance 104. However, many of the processes disclosed herein to be run by the SVM 236 may benefit from being performed on the Storage Virtualization Manager (SVM) product available from LSI Corporation. Beneficially, the LSI Corporation SVM performs storage virtualization such that the specific storage virtualization requested/desired by an embodiment may be quickly implemented by the LSI Corporation SVM. That being said, the SVM disclosed herein with respect to the various embodiments is not limited to the SVM device/appliance product from LSI Corporation, but instead the SVM of the various embodiments represents any device capable of performing the necessary processes of an embodiment with the LSI Corporation SVM being only one example of such a capable device (s). Again, for a further description of operation of various embodiments that include a management station and an SVM, see the disclosure below, particularly the disclosure with respect to FIG. 2.

The user service request 102 for the cloud served software application/service 132 may contain at least two portions of software application/service request data, a server computing resource identification information portion and a software identification information portion. The server computing resource identification information portion of the user service request 102 may identify the type, memory size, and other technical aspects of the necessary computing resources that will ultimately be wanted by the user to run the requested 102 cloud served software application/service 132. Since a wide variety of server computing resources may properly run many, if not most, requested 102 cloud served software applications 132, and since the cost of the providing the cloud served software application 132 may vary significantly with the exact server computing resources used to run the cloud served software application 132, embodiments may rely on the user to determine the specifications for the server computing hardware, such as defining/identifying/selecting the processor type, memory type, and sometimes the IP (Internet Protocol) address of the server computing resources once the server computer resources are up and running the requested 102 cloud served software application. For some embodiments, where it is not important to the customer to define the IP address of the server(s) (i.e., the server computing resources), the IP address may be assigned to an open IP address available to the cloud service company that is implementing, managing, and controlling the cloud served software application 132. Since the required storage resources are highly dependent on the requested 102 cloud served software application 132, the user request may simply define the desired software application/service in the software identification portion of the user request 102. Thus, the user does not have to have a technical understanding of the software application and what the storage resources that will be necessary to store the software and data associated with the requested 102 cloud served software application 132.

Accordingly, a user service request for an application 102, may be conveniently represented in an XML (eXtensible Markup Language) document/message. XML is a convenient choice for the format/syntax of the user service request 102, but any text, binary or other format/syntax that is capable of identifying the necessary data in the server computing resources identification information portion and identifying the desired software application and operating system in the software identification information portion of the user request 102. Further, software options, possibly such as the type/version of operating system and/or the version of the software, may also be identified in the software identification information portion of the user request 102. An example of a user service request 102 in XML format for one embodiment is shown in the XML contained in Table 1 below.

TABLE 1

```
<service>
    <processor type="x86" speed="1.6"/>
    <memory type="ddr" size="2G" />
    <ipaddress>
        <ip1> 135.24.223.136 </ip1>
        <ip2> 135.24.223.137 </ip2>
    </ipaddress>
    <software>
        <operatingsystem type="WINNT" version="2008"/>
        <applications>
            <app type="e-mail" id="microsoftexchange" />
            <app type="db" id="mssql" />
        </applications>
    </software>
</service>
```

Notably, the example XML service request for an application 102 shown in Table 1 above does not include any technical specifications describing the required computer readable storage, but only a definition of what will be the installed/provisioned software desired by the user. Various server computing resource aspects defined, including the processor type, the memory type of the RAM (Random Access Memory) used for runtime operations, and the IP addresses associated with the server computing resources. In the structure of the example XML service request for an application 102 shown in Table 1, the software section is clearly delineated by the "<software>" tags indicating the software identification information portion with the remainder of the XML example request describing the server computing resources identification information portion. Also, the XML service request 102 may be sent over (i.e., wrapped in) any network/application aware appliance 104 supported protocol, such as the well known HTTP (Hyper Text Transfer Protocol).

Using a software application templates array 112 (individually, templates 114-118), the application aware appliance 104 may intelligently determine the size of the computer readable storage volume/array necessary to implement the user request 102. Further, based on the typical Input/Output (I/O) speed of the requested 102 cloud served software application 132, the application aware appliance may also intelligently select a type of storage hardware, including taking into account cost-benefit ratios of upgrading speed. For instance, based on the size of the core installation After receiving the user service request 102, the application aware appliance 104 may handle the server computing resources identification information portion of the request. In some embodiments, the application aware appliance 104 may perform all server computing resource selection/configuration processes within the application aware appliance 104. Thus, the application aware appliance 104 may directly interpret the server computing resources identification information portion of the user request, appropriately select server computing resources from the server computing cloud 108 (i.e., a plurality of server computing resources), and configure the selected server computing resources with storage resource identification data for the selected storage volume(s)/array(s). The embodiment may then send 106 commands necessary to select and configure the server computing resources directly from the application aware appliance 106 to the selected server computing resources in the server computing cloud 108. Typical storage identification data for the selected storage volume(s)/array(s) may include, but is not limited to: a Logical Unit Number (LUN) identifier for the selected storage volume(s)/array(s), a World Wide Name (WWN) identifier for the selected storage volume(s)/array(s) (a WWN is typically associated with storage technology using Fibre Channel, for which the WWN is a 64 bit address), standard network addressing information (such as an IP address), and/or any other storage addressing information the selected server computing resources may need to properly interact with the selected storage resources. The storage resources may be addressed as to the physical storage devices and/or the storage addressing may address virtual storage resources. Once server computing resources are selected from the server computing cloud 108, the selected server computing resources may be read for and/or may report the Host Bus Adapter (HBA) data of the server computing resources necessary to identify the server computing resources on the bus/network interconnecting the server computing resources and the storage resources. In some embodiments, the server computing resources and the storage resources may be interconnected via a Storage Area Network (SAN). Some specific storage bus technology may include SCSI (Small Computer System Interface), SAS (Serial Attached SCSI), iSCSI (Internet SCSI), and standard networking technology (e.g., Ethernet, wireless WiFi, TCP/IP based networks, etc.). Regardless of the interconnection technology, the application aware appliance 104 will need to read and/or receive 106 the HBA details of the selected server computing resources in order to properly configure/map the selected storage resources to the selected server computing resources. Notably, the HBA details of the selected server computing resources likely include similar addressing information for the server computing resources (e.g., a WWN with a different numerical value may also identify the HBA as well as the storage resources for a system with Fibre Channel interconnection technology between the server computing resources and the storage resources).

In other embodiments, the application aware appliance 104 may simply initiate the server computing resource selection/creation by forwarding 106 the server computing resource identification information portion of the user request to a managing resource in the server computing cloud 108. The managing resource in the server computing cloud 108 may then directly select the server computing resources, obtain the HBA data details from the selected server computing resources and report 106 the HBA data details and any other identification data that may be useful to the operation of the application aware appliance 104. The application aware appliance 104 is still effectively managing the selection of the server computing resources by sending appropriate commands to the manager resource in the server computing cloud 108.

Since a typical service request for an application 102 requests an end-to-end solution requiring setting up both server computing nodes/resources, either physical or virtual servers, and storage volumes/arrays/resources which will actually host/hold the data and software programs. Accordingly, either concurrently with, before, or after the application aware appliance 104 processes the selection of the server computing resources from the server computing cloud, the application aware appliance 104 may also process the creation/selection of the computer readable storage resources from the storage resource cloud 128 (i.e., a plurality of available storage volumes/arrays). The application aware appliance 104 may extract the software identification information portion of the user service request 102, then compare the requested/desired software from the user service request 102 to available storage templates 114-118 in a template storage array 112 (i.e., a plurality of storage templates 114-118) that are a subset of the storage resource cloud 128. The application aware appliance 104 communicates 110 with the storage resource cloud 128 sending 110 commands and data requests and receiving 110 status and data updates from the storage resource cloud 128 including data from the template storage array 112 and the available/connected storage pools 120. The storage templates 114-118 may be pre-defined, pre-provisioned storage volumes holding (i.e., having installed) with each storage template 114-118 holding one of a variety of standard and/or widely requested software applications/services. Various embodiments may also provide a process for customizing and/or creating new templates based on a service request 102 and/or in anticipation of future service requests 102. One or more storage arrays/volumes 112 in the storage resource cloud 128 may be dedicated to holding the software application storage templates 114-118. The remaining storage arrays/volumes 122-126 (together referred to as the storage pools 120) of the storage resource cloud 128 may be left available for the application aware appliance 104 to select, configure, and provision to actually provide the requested 102 cloud served software application 132. To comprehensively include all of the necessary software to provide a service request, each template will typically include, have installed, an Operating System (OS) in addition to the particular application software that a user desires to use. As an illustration of storage template, the three example storage templates shown in FIG. 1 include: template 1 (114) having the Microsoft Windows OS with the Microsoft Exchange e-mail application, template 2 (116) having the Solaris OS and the Oracle database application, and template N 118 having the Redhat Linux OS and the JBoss Application Server middleware application. Each storage template volume/array 114-118 may be associated with meta-data that represents the storage template. The application aware appliance 104 may compare the software identification information portion of the service request 102 to the available application storage templates 114-118 and select the application storage template 114-118 that includes/has installed software that matches the software in the service request 102.

In the situation where the application aware appliance 104 is unable to find a pre-defined and pre-provisioned application storage template 114-118, it may be necessary to customize a current application storage template 114-118 or create a new application storage template 114-118. One process for customizing a current application storage template 114-118 may be for an IT Administrator to edit a current application storage template 114-118 to have the same attributes as received in a service request 102, and then to save the edited template as a new reusable application storage template 114-118. Similarly, if there is not a current application storage template 114-118 that makes sense to edit, the IT Administrator may simply create a new reusable application storage template 114-118 and install/provision the new reusable application storage template 114-118 with the software asked for in the service request 102. The newly created storage templates 114-118 may also be redistributed across different geographical locations for re-use so that different data centers located geographically remote from each other may have a similar library of available application storage templates 114-118. Also, it would be beneficial for an IT Administrator to attempt to anticipate common requests and create the pre-defined and pre-provisioned application storage template 114-118 for commonly expected requested application requests 102. To help speed up the service request 102 processing time of an embodiment, it is beneficial to start with a good library of anticipated application storage templates 114-118. It may also be important to anticipate and create a new application storage template 114-118 prior to a request 102 during current operation when new application software is introduced to the market that is expected to be requested 102 by future users.

In some embodiments, a new application storage template 114-118 may be created automatically by the application aware appliance 104 if a matching application storage template 114-118 for the service request 102 cannot be found in the application template storage array 112. To automatically create a new application storage template 114-118, the application aware appliance 104 may create a new volume (with a new LUN) in the template storage array 112 and associate then new volume/LUN with meta-data matching the service request 102. The application aware appliance 104 may then install the necessary software to match the meta-data of the new application storage template 114-118. For some embodiments, a third party tool, like the Hewlett-Packard Rapid Deployment Pack, may be used to assist in the software installation/provisioning for the newly created application storage template 114-118.

Once the application aware appliance 104 selects a matching application storage template 114-118 for the service request 102, including selecting a newly created application storage template 114-118 created for the service request 102, the application aware appliance may then intelligently select a storage volume/array 122-126 that meets the size requirements of the selected application storage template 114-118. The selected storage volume/array 122-126 may be an array comprised of one or multiple volumes, or the selected storage volume may be an individual member of a storage array 122-126, such as individual member/volume/LUN 134 shown in FIG. 1. A volume may also be an array of disks such as when using a RAID (Redundant Array of Independent Disks) as well as virtually addressed and managed volumes created in accordance with the virtual volume constraints of a particular system. The application aware appliance 104 may then initiate a volume copy from the selected application software template 114-118 to the selected storage volume 122-126 in order to provision the selected storage volume 122-126 with the software in the selected application storage template 114-118. The application aware appliance 104 may also obtain the storage resource addressing information necessary to properly access/link the selected storage resources from the selected server computing resources. For example, the application aware appliance 104 may identify the LUN(s), WWN(s), and/or other addressing appropriate for the type/protocol of the selected storage resources.

The application aware appliance 104 may also intelligently select the storage volume/array 122-126 based on other factors known for a particular requested 102 cloud served software application 132. For instance, anticipated Input/Output (I/O) communication requirements for a particular cloud served software application 132 may suggest to the application aware appliance 104 that a higher speed storage resource 122-126 should be selected over a lower speed storage resource 122-126. Further, since higher speed storage resources 122-126 may be more expensive than a lower speed alternative, if the requested 102 cloud served software application does not have a significant reliance on high I/O speed, then a lower speed storage resource 122-126 may be selected. For instance, a cloud served software application 132 providing real-time video and/or audio streaming will likely benefit tremendously from a higher speed storage resource 122-126 due to the real-time, data intensive nature of the video/audio streaming technology. Hence, based on the current state of the art for storage technology at the time of writing this document, an embodiment of the application aware appliance 104 may decide that a high speed I/O intensive cloud served software application such as video/audio streaming may benefit from using SAS (Serial Attached SCSI) storage devices since SAS devices currently typically have the highest I/O performance in comparison to other current storage interface technologies. On the other hand, if the request 102 is simply to host a shared file storage, the application aware appliance 104 may select an iSCSI interface, which may have slower overall I/O, but is likely more appropriate for storing files as a shared device.

To configure the selected storage resources, the application aware appliance 104 will need the HBA information/data details obtained/identified from the selected server computing resources as well as the selected storage resource identification information/data. The application aware appliance 104 may then map the selected storage resource identification information/data (e.g., the selected storage volume LUN) to the selected server computing resource HBA information/data details (e.g., the selected server computing resource HBA WWN) so that the selected storage resource (e.g., selected storage resource LUN) is visible to the selected server computing resource(s). Similarly, the application aware appliance 104 may configure the selected server computing resource(s) to boot from and access programs/data from the selected storage resources using the storage resource identification information/data associated with the selected storage resource(s).

An application aware appliance 104 may also automatically provide for disaster recovery for a requested 102 cloud served software application. The application aware appliance 104 may automatically create a remote volume mirror for the selected storage resources, which will act as both a backup for the selected/primary storage resources, but may also permit a system to automatically switch over to the remote volume mirror during runtime operation if the selected/primary storage resources fail or become unreachable for some reason by having the application aware appliance 104 automatically rout the I/O to the secondary remote volume mirror. Accordingly, an embodiment may provide significant additional assurance that the delivered solution/cloud server software application 132 will be disaster resistant. The application aware appliance 104 may intelligently decide to create a remote volume mirror for requests 102 that match particular application storage templates 114-118 that have been determined to be critical applications. The application aware appliance 104 may also create a remote volume mirror if a critical/mirror request is incorporated in the service request 102 from the user.

Figure 2:
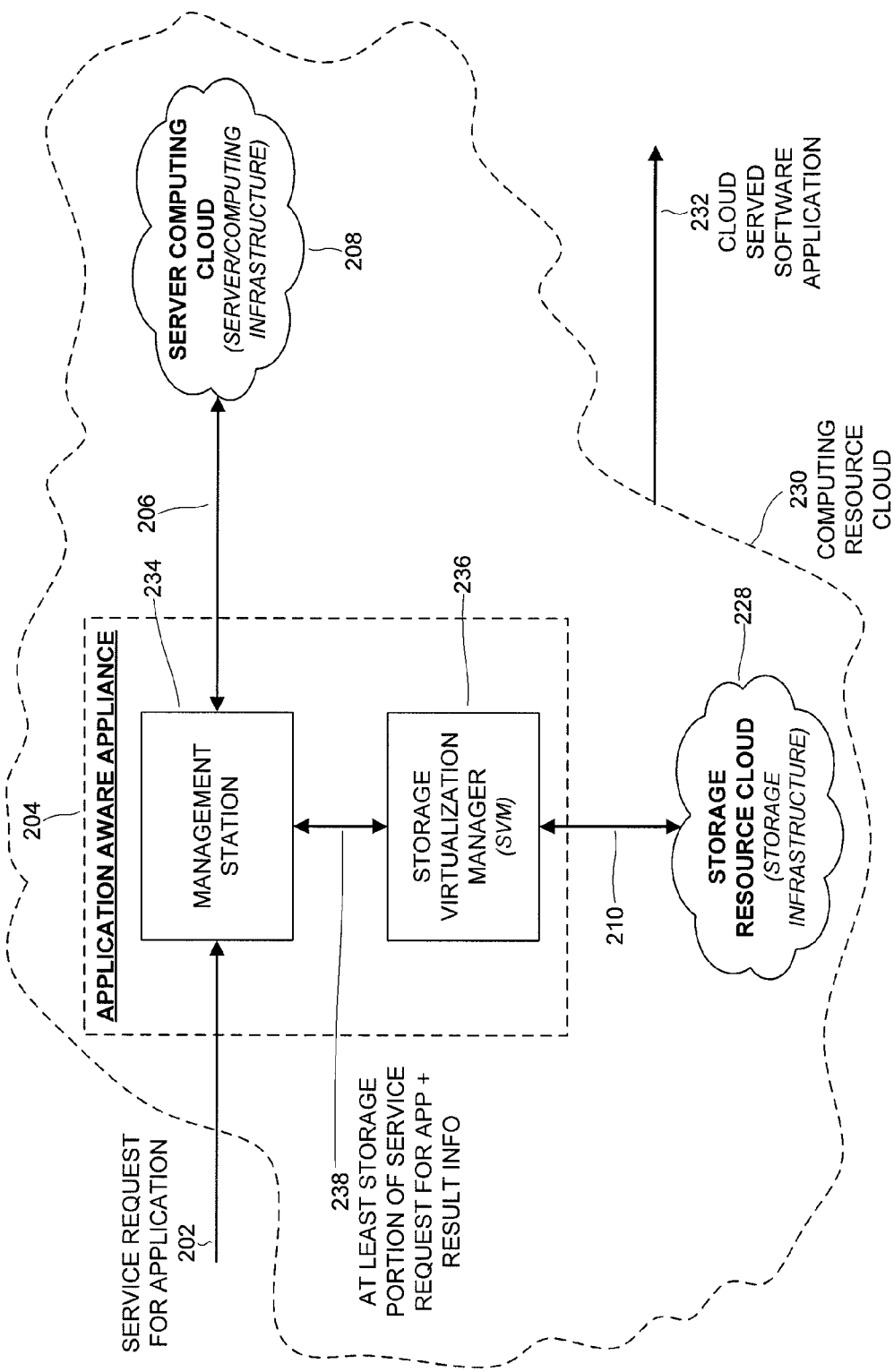
FIG. 2 is a schematic illustration of the application aware appliance having/using a management station sub-system and a Storage Virtualization Manager (SVM) sub-system.

FIG. 2 is a schematic illustration 200 of the application aware appliance 204 having/using a management station sub-system 234 and a Storage Virtualization Manager (SVM) sub-system 236. The general operation of the embodiment shown in FIG. 2 with respect to the overall operation of the application aware appliance 204 is similar in most regards to the operation as disclosed with respect to FIG. 1 above. Generally, a service request for an application 202 is received by the application aware appliance 204. The application aware appliance 204 selects server computing resources from the server computing cloud 208 based on the server computing resource identification information portion of the service request 202 and obtains/identifies identifying information about the HBA(s) of the selected server computing resources. The application aware appliance 204 also (either concurrently, before or after selecting the server computing resources) compares the requested software identification information portion of the service request 202 to application software templates stored/maintained in the storage resource cloud 228 and selects an application storage template that matches the requested 202 software. If there is not a matching application software template currently in the application storage template array of the storage resource cloud 228, then a new application storage template may be created from scratch or based on editing of a current software application template, either manually by an IT Administrator or automatically by the application aware appliance 204. With an application storage template selected, the application aware appliance 204 may then select a storage volume/array from the available storage resources of the storage resource cloud 228 and obtain/identify identifying information (e.g., addressing information) about the selected storage volume/array. The application aware appliance 204 may then initiate a volume copy from the selected application storage template to the selected storage volume/array that will copy the necessary software to implement the requested 202 cloud served software application 232. The application aware appliance 204 may map the selected server computing resource HBA information to the selected storage resources such that the selected server computing resource will boot from the selected storage resources (i.e., selected storage volume/array). The application aware application aware appliance 204 may also configure the selected computer resources to operate using the selected storage resources based on the identifying (e.g., addressing) information of the selected storage resources. With the storage/server computing resource selection, provisioning, and configuration complete, an embodiment has implemented the service request 202 from end-to-end such that the computing resource cloud 230 now provides the cloud served software application 232 to the requesting user.

As described above, the embodiment shown in FIG. 2 generally provides the same functionality as the embodiment disclosed above with respect to FIG. 1. However, in the embodiment illustrated in FIG. 2, the application aware appliance is particularly split into two sub-systems, the management station sub-system 234 and the Storage Virtualization Manager sub-system 236 that together provide for the processes/functions of the application aware appliance 204. The operation of the SVM 236 for the particular embodiment illustrated for FIG. 2 is for a specialized appliance/device designed specifically to handle storage virtualization and storage resource management. A good example of such a device is the LSI Corporation product of the same name, the LSI Corporation Storage Virtualization Manager (SVM). Further, a general purpose computer programmed to perform the storage virtualization/storage management may also be utilized as an SVM 236 for the embodiment shown in FIG. 2. The management station 234 of the embodiment shown in FIG. 2 provides additional functionality for handling the service request 202, particularly in handling/configuring the server computing resources necessary to provide a complete end-to-end implementation of the service request 202. The management station 234 may be a general purpose computer or other general purpose computing device programmed to provide the specific functions/features disclosed herein, or the management station 234 may be a special purpose computer designed specifically to provide the functions/features disclosed herein.

For the embodiment shown in and disclosed with respect to FIG. 2, devices with similar functionality to the LSI Corporation SVM may be used as the SVM 236 for an embodiment. Further, while the disclosure herein may describe particular operations for the SVM 236 (and the management station 234), other embodiments may choose to split the processes between a management station 234 and a SVM 236 in a different manner while still naming two sub-systems 234, 236 of the application aware appliance 204 the same as illustrated in FIG. 2, and still remain functional embodiments as long as the overall functionality/processes provide the features of an embodiment.

The operation of the management station 234 of the embodiment shown in FIG. 2 is to perform the functions/features with regard to selection, management and configuration of the server computing resources as is disclosed above in the disclosure with respect to FIG. 1 and the actions of the application aware appliance (104) of FIG. 1. The SVM 236 of the embodiment shown in FIG. 2 is to perform the functions/features with regard to selection, management, provisioning (i.e., copying) and configuration of the storage resources as is disclosed above in the disclosure with respect to FIG. 1 and the actions of the application aware appliance (104) of FIG. 1. Particularly, in the embodiment illustrated in FIG. 2, the management station 234 may be a point of contact for the service request for an application 102 from a user. The management station may then directly handle the selection of the server computing resources from the server computing cloud 208 or forward the necessary server computing resource identification information portion to a management resource in the server computing cloud 208 and have the management resource the server computing cloud 208 select the server computing resources and report back the selected server computing resources HBA(s) identification information/details as is further described above in the disclosure with respect to the operation of the application aware appliance 104 of FIG. 1. The various commands and data details (e.g., HBA information) are communicated 206 over network or other communication interconnect technology between the management station 204 and the server computing cloud 208. The management station 234 may forward 238 at least the application software identification information portion of the service request 202 to the SVM 236. While it is not necessary for the SVM 236 to receive the entire service request 202, including the server computing resource identification information portion of the service request 202, the actual extraction of the application software identification information portion of the service request 202 may be performed at either the management station 234 prior to forwarding 238 to the SVM 236 or at the SVM 236 after receiving the entire service request 202.

The SVM 236 may then perform the processes/functions of the application aware appliance 204 for handling (selecting, provisioning, and configuring) the storage resources for an embodiment as disclosed above with respect to the application aware appliance 104 of FIG. 1. The SVM 236 sends commands to and receives status/identification information from the storage resource cloud 228 over the network/other communications technology link 210. The SVM 236 may compare the requested software of the service request 202 to an array of pre-defined pre-provisioned reusable storage application templates to select a storage application template that matches the requested software of the service request 202. If there is not a matching storage application template, the SVM 236 may create a new volume/array in the application storage template array and pass the new volume/array identification information (e.g., LUN data) to the management station 234 and have the management station 234 automatically provision the new volume/array in the application software storage template array with the desired software as defined in the service request 202. The management station 234 may employ third party software (such as the Hewlett Packard Rapid Deployment Pack) to install the desired software on the newly created volume/array of the application software storage template array. Once the newly created application software template is created and provisioned (i.e., software is installed), the SVM 236 may select the newly created and matching application storage template. The SVM 236 may then intelligently select (see the disclosure with respect to FIG. 1 for more details on the intelligent selection details) available storage resources (i.e., storage volume(s)/array(s)) from the storage resource cloud 228 that meet the requirements of the selected application software storage template. The SVM 228 may then initiate a volume copy of the application software from the selected application software storage template to the selected storage resources in order to copy/provision the selected storage resources. The SVM may also identify/obtain the identifying (e.g., addressing) information of the selected storage resources. The SVM 236 may communicate 238 the selected storage resource(s) identifying (e.g., addressing) information to the management station 234. The management station 234 may communicate 238 the selected server computing resource(s) HBA(s) identification information/details to the SVM. The SVM may map the selected server computing resource(s) HBA(s) information/details to the selected storage resource(s) identification information in order to permit the selected storage resource(s) to boot from the selected storage resource(s). The management station 234, using the storage resource identification information supplied by the SVM 236, may then configure the selected server computing resource(s) using the storage resource identification information of the selected storage resource(s) to operate using the selected storage resource(s). The management station 234 may configure the selected server computing resource(s) directly or forward the information to a management resource with the server computing cloud 208 to complete the configuration of the selected server computing resource(s). The SVM 236 may also handle providing a remote volume mirror for disaster recovery/mitigation (disclosed in more detail above in the disclosure with respect to FIG. 1).

Figure 3:
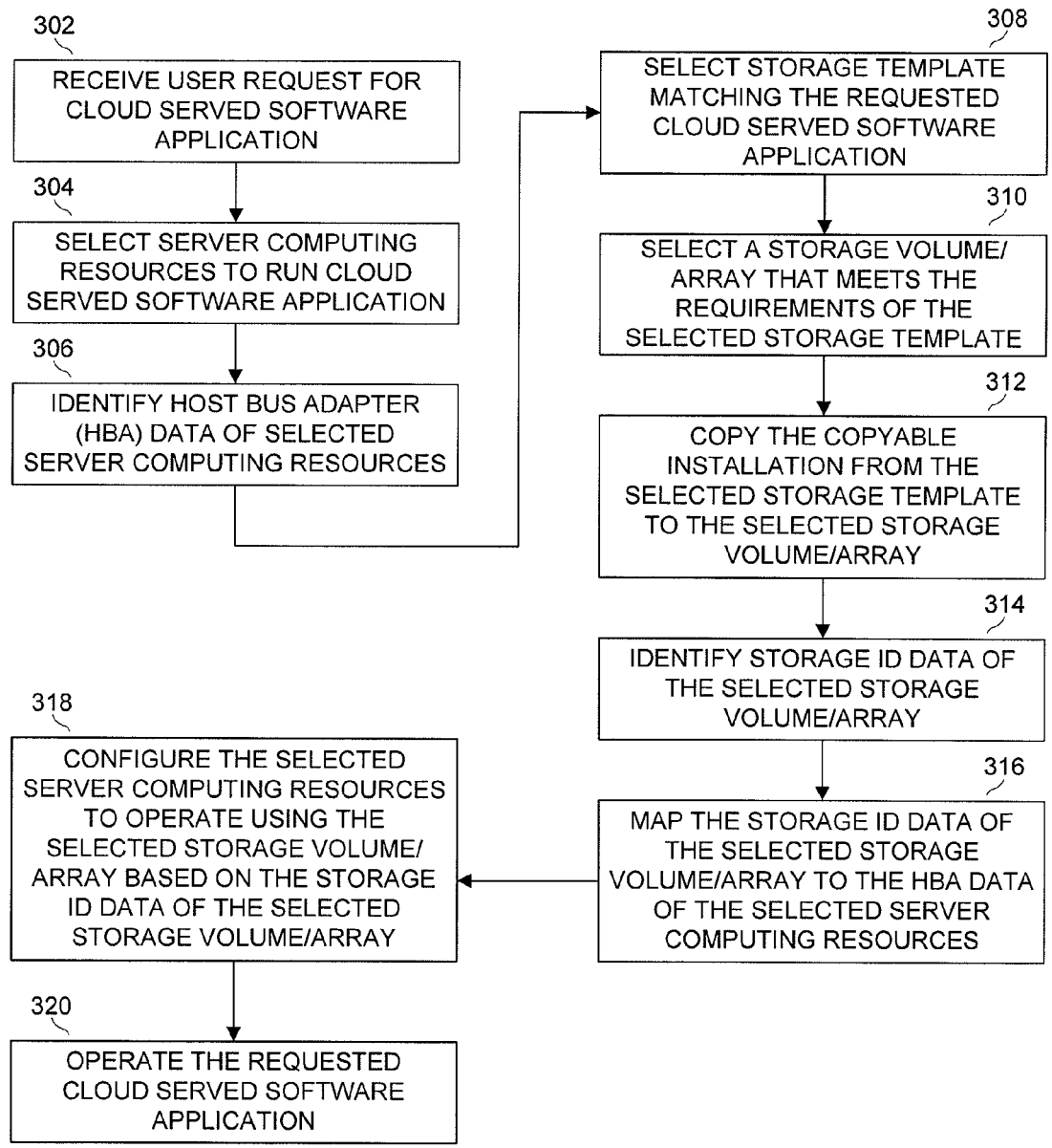
FIG. 3 is a flow chart of basic operation for an embodiment.

FIG. 3 is a flow chart 300 of basic operation for an embodiment. At process 302, a user request for a cloud served software application is received. At process 304, the server computing resources to run the requested cloud served software application are selected. At process 306, the Host Bus Adapter (HBA) information/data/details of the selected server resources are identified/obtained. At process 308, an application software storage template of a plurality of pre-define pre-provisioned reusable application software storage templates that matches the requested application software is selected. Note that if a matching application software storage template is not found, a new one may be created (and then selected) either manually or automatically as described in more detail in the disclosure above with respect to FIG. 1. At process 310, a storage volume/array that meets the requirements of the selected application software storage temple is selected from a plurality of available storage volumes/arrays. At process 312, the copyable installation from the selected storage template is copied (by initiating a volume copy) from the selected application storage template to the selected storage volume/array. At process 314, the identifying information (e.g., addressing information) for the selected storage volume/array is identified/obtained. At process 316, the storage identification information of the selected storage volume/array is mapped to the HBA information/data/details of the selected server computing resources such that the selected server computing resources may boot from the selected storage volume/array. At step 318, the selected server computing resources are configured to operate using the selected storage volume/array based on the storage identification data/information of the selected storage volume/array. At process 320, the computing resource cloud operates the requested cloud served software application using the selected server computing resources and the selected and provisioned storage volume/array.

Figure 4:
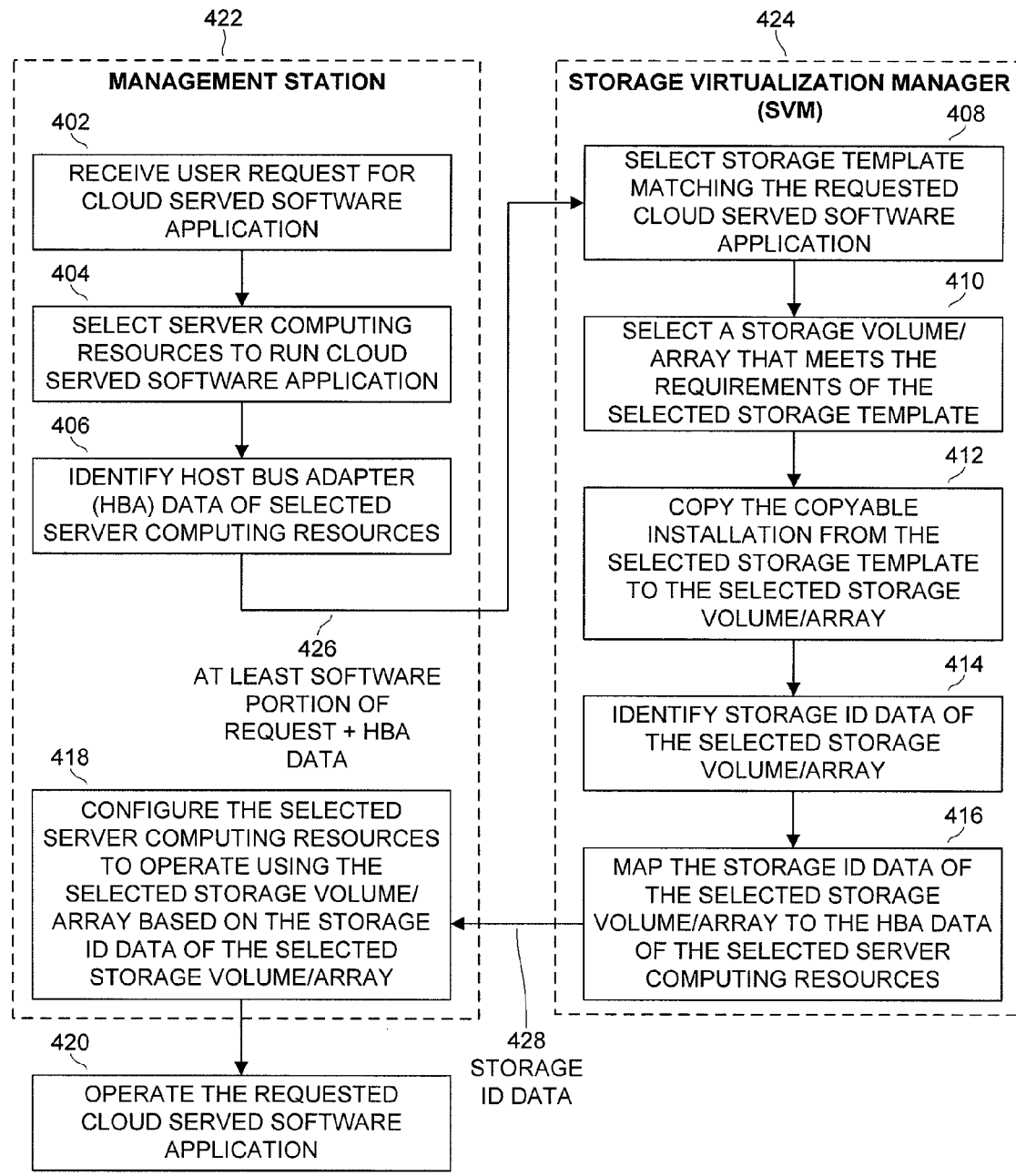
FIG. 4 is a flow chart of basic operation for an embodiment broken down for implementation by a management station sub-system and a SVM sub-system.

FIG. 4 is a flow chart 400 of basic operation for an embodiment broken down for implementation by a management station sub-system 422 and a SVM sub-system 424. The processes 402-420 illustrated in FIG. 4 operate in a similar manner as described for processes 302-320 of FIG. 3. However, the processes 402-420 of FIG. 4 are shown to be assigned to/performed by two sub-systems of an overall application aware appliance embodiment, similar to the embodiment disclosed above with respect to FIG. 2. Processes 402-406 to receive a service request 402, select server computing resources based on the request 404, and identify/obtain the HBA data/details/information of the selected server computing resources 406 are all processed by/assigned to the management station sub-system 422 of an application aware appliance. The management station 422 then sends the request (or at least the application software identification portion of the request) plus the HBA data details of the selected server computing resources to the SVM sub-system 424 of the application aware appliance. The SVM sub-system 424 is handles processes 408-416 to select a application storage template that matches the requested application software from an array of application storage templates 408, select storage volume(s)/array(s) that meet the requirements of the selected application software storage template 410, copy the installation of the application software from the selected application software storage template to the selected storage volume(s)/array(s) 412, indentify/obtain the storage identification information of the selected storage volume(s)/array(s) 414, and map the storage identification data of the selected storage volume(s)/array(s) to the HBA data/details/information of the selected server computing resources 416. The SVM 424 reports/delivers 428 the storage identification information/data to the management station 422. The management station 422 also handles process 418 that configures the selected server computing resources to operate using the selected storage volume(s)/array(s) based on the storage identification information/data of the selected storage volume(s)/array(s). At process 420, the computing resource cloud operates the requested cloud served software application using the selected server computing resources and the selected and provisioned storage volume/array.

Figure 5:
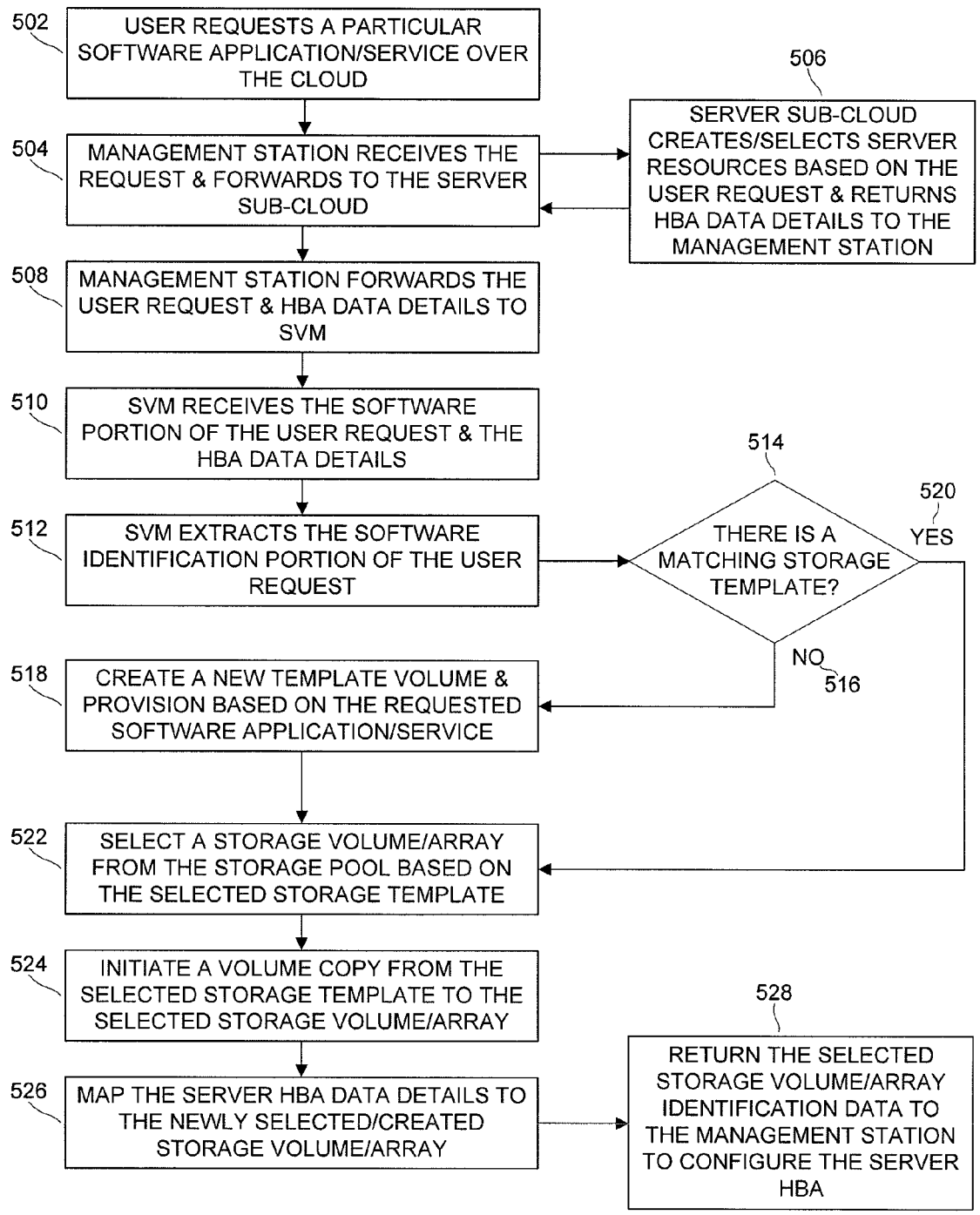
FIG. 5 is a flow chart of operation for an embodiment having various additional features.

FIG. 5 is a flow chart 500 of operation for an embodiment having various additional features not in the basic flowcharts of FIGS. 3 and 4. At process 502, a user requests a particular software application/service over the computing resource cloud. At process 504, a management station sub-system of an application aware appliance receives the user request and forwards at least the server computing resource identification portion of the user request to the server sub-cloud. At process 506, the server sub-cloud (or a management resource within the server sub-cloud) selects/creates an instance of the necessary server computing resources and returns HBA identification data details to the management station. At process 508, the management station forwards the user request and the HBA identification information data details to an SVM sub-system of the application aware appliance. At process 510, the SVM extracts the application software identification portion of the user request from the user request. Note, that other embodiments having management station and SVM sub-systems may extract the application software identification portion of the user request at the management station and only forward the application software identification information portion of the user request to the SVM. At process 514, the SVM checks an application storage template array to see if one of the application storage temples in the array of application storage templates matches the requested application software. If there is not a matching template 516, the flow chart 500 moves to process 518. At process 518, a new application storage template storage volume/array is created by the SVM and provisioned with the desired software application by the management station (and/or manually). Notably, having application storage templates pre-defined and pre-provisioned rather than depending on the application storage template to be created at the time of the user request saves significant user request processing time since provisioning, even automatically, the newly created application storage template may take significant time versus processing a request with a pre-defined and pre-provisioned application storage template. Once the new application storage template is created the SVM moves to process 522. If there is a matching template at process 514, 520 the flow chart 500 moves to process directly to process 522 without the need to perform template creation process 518 first. At step 522, the SVM intelligently selects storage volume(s)/array(s) from the storage pool of the plurality of storage volumes/arrays available to the SVM based on the matching (i.e., selected) application software storage template. At process 524, the SVM initiates a volume copy from the selected (i.e., matching) application software storage template to the selected storage volume(s)/array(s). At process 526, the SVM maps the selected server computing resource HBA data details to the newly selected/created storage volume(s)/array(s) so the server computing resources may boot from the selected storage volume(s)/array(s). At process 528, the selected/created storage volume(s)/array(s) storage identification data (e.g., addressing data) is returned to the management station and the management station configures the selected server computing resources based on the storage identification data of the selected storage volume(s)/array(s) so that the selected server computing resources may operate with the selected and provisioned storage volume(s)/array(s) to provide the requested cloud served software application to the user from the computing resource cloud.

For an embodiment system, the various processes of the above described embodiments, including the processes described in the flow charts 300, 400, 500 of FIGS. 3-5 may be implemented as individual systems and/or as sub-systems of an overall system embodiment.

The various embodiments may provide many advantages. Since the entire process for an embodiment for a requested software application/service is automated, there is not a need for human intervention/IT Administrator intervention, which leads to faster request processing times. The pre-defined pre-provisioned application software storage templates may be reused permitting the various embodiments to have minimal time to get new application software requests provisioned with the templates. Since the application software storage templates are customizable, an IT Administrator may create new templates from existing templates with minimal editing.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMs (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EE-PROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for automatic end-to-end storage provisioning by an application aware appliance of a software application served by a computing cloud based on a user request for a cloud served software application, said method comprising:

receiving, at said application aware appliance, said user request for said cloud served software application, said user request for said cloud served software application containing identifying information about said requested cloud served software application including at least a server computing resource identification information portion and a software identification information portion, said software identification portion defining an identity of said cloud served software application, a version of said cloud served software application, and an associated operating system for said cloud served software application;

selecting, by said application aware appliance, server computing resources for running said requested cloud served software application from a server computing cloud that is a subset of said computing cloud based on said server computing resource identification information portion of said user request for said cloud served software application;

identifying, by said application aware appliance, Host Bus Adapter (HBA) data of said selected server computing resources;

selecting, by said application aware appliance, a software application storage template from a plurality of software application storage templates based on said software identification information portion of said user request for said cloud served software application, each software application storage template of said plurality of software application storage templates being associated with a copyable installation of said requested cloud served software application associated with each software application storage template;

selecting, by said application aware appliance, a storage volume from a plurality of available storage volumes that are part of a storage resource cloud that is a subset of said computing cloud that meets storage requirements of said selected software application storage template by intelligently evaluating input/output characteristics of said requested cloud served software application and further basing said selection of said storage volume on said intelligently evaluated input/output characteristics of said requested cloud served software application, wherein said intelligently evaluated input/output characteristics of said requested cloud served software application are at least one of a group consisting of: high speed video streaming, high speed audio streaming, and basic shared file storage;

copying, by said application aware appliance, said copyable installation of said requested cloud served software application associated with said selected software application storage template to said selected storage volume;

identifying, by said application aware appliance, storage identification data of said selected storage volume;

mapping, by said application aware appliance, said storage identification data of said selected storage volume to said Host Bus Adapter (HBA) data of said selected server computing resources;

configuring, by said application aware appliance, said selected server computing resources to operate using said selected storage volume based on said storage identification data of said selected storage volume; and operating, by said computing cloud, said selected server computing resources and said selected storage volume together to serve said requested cloud served software applicationil;

wherein said software application aware appliance is comprised of at least one computing device.

2. The method of claim 1 further comprising:

providing a management station sub-system that is part of said application aware appliance such that said management station sub-system handles said processes of receiving said user request for said cloud served software application, selecting said server computing resources for running said requested cloud served software application, identifying said Host Bus Adapter (HBA) data of said selected server computing resources, and configuring said selected computing resources to operate using said selected storage volume;

providing a storage virtualization manager sub-system that is part of said application aware appliance such that said storage virtualization manager sub-system handles said processes of selecting said software application storage template from said plurality of software application storage templates, selecting a storage volume form a plurality of available storage volumes, copying said copyable installation of said requested cloud served software application associated with said selected software application storage templat to said selected storage volume, identifying said storage identification data of said selected storage volume, and mapping said storage identification data of said selected storage volume to said Host Bus Adapter (HBA) data of said selected server computing resources;

sending, by said management station sub-system, at least said software identification information portion of said user request and said Host Bus Adapter (HBA) data of said selected server to said storage virtualization manager sub-system;

receiving, by said storage virtualization manager sub-system, at least said software identification information portion of said user request and said Host Bus Adapter (HBA) data of said selected server;

sending, by said storage virtualization manager sub-system, said storage identification data of said selected storage volume to said management station sub-system; and receiving, by said management station sub-system, said storage identification data of said selected storage volume.

3. The method of claim 1 wherein said process of selecting said server computing resources for running said requested cloud served software application from said server computing cloud based on said server computing resource identification information portion of said user request for said cloud served software application further comprises:

forwarding, by said application aware appliance, said server computing resource identification information portion of said user request for said cloud served software application to a server management resource of said server computing cloud;

selecting, by said server management resource of said server computing cloud, said server computing resources for running said requested cloud served software application from said server computing cloud based on said forwarded server computing resource identification information portion of said user request for said cloud served software application;

identifying, by said server management resource of said server computing cloud, said Host Bus Adapter (HBA) data of said selected server computing resources; and delivering, by said server management resource of said server computing cloud, said Host Bus Adapter (HBA) details of said selected server computing resources to said application aware appliance.

4. The method of claim 1 further comprising:

creating, by said application aware appliance, a remote volume mirror of said selected storage volume; and rerouting, by said application aware appliance, input/output communications to said remote volume mirror when said selected storage volume has failed.

5. The method of claim 1 further comprising:

creating, by said application aware appliance, a new software application storage template when a matching software application storage template is not found for said requested cloud served software application; and provisioning, by said application aware appliance, said new software application storage template with software based on said software identification information portion of said user request for said cloud served software application.

6. The method of claim 1 wherein said user request for said cloud served software application does not contain storage requirement identification information such that said process of selecting said software application storage template from said plurality of software application storage templates based on said software identification information portion of said user request for said cloud served software application is based on software identification information and not storage requirements information such that a user does not need to know technical information about storage requirements to request said cloud served software application.

7. The method of claim 1 wherein said processes of said method for automatic end-to-end storage provisioning by said application aware appliance of said software application served by said computing cloud based on said user request for said cloud served software application are performed automatically without user information once said user request is sent to said application aware appliance.

8. The method of claim 1 wherein said process of copying said copyable installation of said requested cloud served software application associated with said selected software application storage template to said selected storage volume is performed via a volume copy from said selected software application storage template to said selected storage volume.

9. An application aware appliance system for automatic end-to-end storage provisioning of a software application served by a computing cloud based on a user request for a cloud served software application, said application aware appliance comprising:

at least one computing device, said at least one computing device further comprising:

an application/service request reception sub-system that receives said user request for said cloud served software application, said user request for said cloud served software application containing identifying information about said requested cloud served software application including at least a server computing resource identification information portion and a software identification information portion, said software identification portion defining an identity of said cloud served software application, a version of said cloud served software application, and an associated operating system for said cloud served software application;

a server computing resources selection sub-system that selects server computing resources for running said requested cloud served software application from a server computing cloud that is a subset of said computing cloud based on said server computing resource identification information portion of said user request for said cloud served software application;

a HBA identification sub-system that identifies Host Bus Adapter (HBA) data of said selected server computing resources;

a software application storage template selection sub-system that selects a software application storage template from a plurality of software application storage templates based on said software identification information portion of said user request for said cloud served software application, each software application storage template of said plurality of software application storage templates being associated with a copyable installation of said requested cloud served software application associated with each software application storage template;

a storage volume selection sub-system that selects a storage volume from a plurality of available storage volumes that are part of a storage resource cloud that is a subset of said computing cloud that meets storage requirements of said selected software application storage template, such that said storage volume selection sub-system intelligently evaluates input/output characteristics of said requested cloud served software application and bases said selection of said storage volume on said intelligently evaluated input/output characteristics of said requested cloud served software application, wherein said intelligently evaluated input/output characteristics of said requested cloud served software application are at least one of a group consisting of: high speed video streaming, high speed audio streaming, and basic shared file storage;

a copy application software sub-system that copies said copyable installation of said requested cloud served software application associated with said selected software application storage template to said selected storage volume;

a storage identification sub-system that identifies storage identification data of said selected storage volume;

a storage mapping sub-system that maps said storage identification data of said selected storage volume to said Host Bus Adapter (HBA) data of said selected server computing resources; and a server computing resources configuration sub-system that configures said selected server computing resources to operate using said selected storage volume based on said storage identification data of said selected storage volume such that said computing cloud may operate said selected server computing resources and said selected storage volume together to serve said requested cloud served software application.

10. The application aware appliance system of claim 9 further comprising:

a management station sub-system that is part of said application aware appliance such that said management station sub-system includes said application/service request reception sub-system, said server computing resources selection sub-system, said HBA identification sub-system, and said server computing resources configuration sub-system;

a storage virtualization manager sub-system that is part of said application aware appliance such that said storage virtualization manager sub-system includes said software application storage template selection sub-system, said storage volume selection sub-system, said copy application software sub-system, said storage identification sub-system, and said storage mapping sub-system;

wherein said management station sub-system further sends at least said software identification information portion of said user request and said Host Bus Adapter (HBA) data of said selected server to said storage virtualization manager sub-system and receives said storage identification data of said selected storage volume from said storage virtualization sub-system; and said storage virtualization sub-system receives said at least said software identification information portion of said user request and said Host Bus Adapter (HBA) data of said selected server from said management station sub-system and sends said storage identification data of said selected storage volume to said management station sub-system to said management station sub-system.

11. The application aware appliance system of claim 9 wherein said server computing resources selection sub-system further forwards said server computing resource identification information portion of said user request for said cloud served software application to a server management resource of said server computing cloud such that said server management resource of said server computing cloud selects said server computing resources for running said requested cloud served software application from said server computing cloud based on said forwarded server computing resource identification information portion of said user request for said cloud served software application, identifies said Host Bus Adapter (HBA) data of said selected server computing resources, and delivers said Host Bus Adapter (HBA) details of said selected server computing resources to said application aware appliance.

12. The application aware appliance system of claim 9 further comprising a remote volume mirror creation sub-system that creates a remote volume mirror of said selected storage volume and reroutes input/output communications to said remote volume mirror when said selected storage volume has failed.

13. The application aware appliance system of claim 9 further comprising:

a software application storage template creation sub-system that creates a new software application storage template when a matching software application storage template is not found for said requested cloud served software application; and a new software application storage template provisioning sub-system that provisions said new software application storage template with software based on said software identification information portion of said user request for said cloud served software application.

14. The application aware appliance system of claim 9 wherein said user request for said cloud served software application does not contain storage requirement identification information such that said process of selecting said software application storage template from said plurality of software application storage templates based on said software identification information portion of said user request for said cloud served software application is based on software identification information and not storage requirements information such that a user does not need to know technical information about storage requirements to request said cloud served software application.

15. The application aware appliance system of claim 9 wherein said copy application software sub-system performs copies via a volume copy from said selected software application storage template to said selected storage volume.

* * * * *